Jan. 18, 1966   C. ERICKSON   3,229,477
ICE CREAM FREEZER AND DISPENSER
Filed March 4, 1963   4 Sheets-Sheet 1
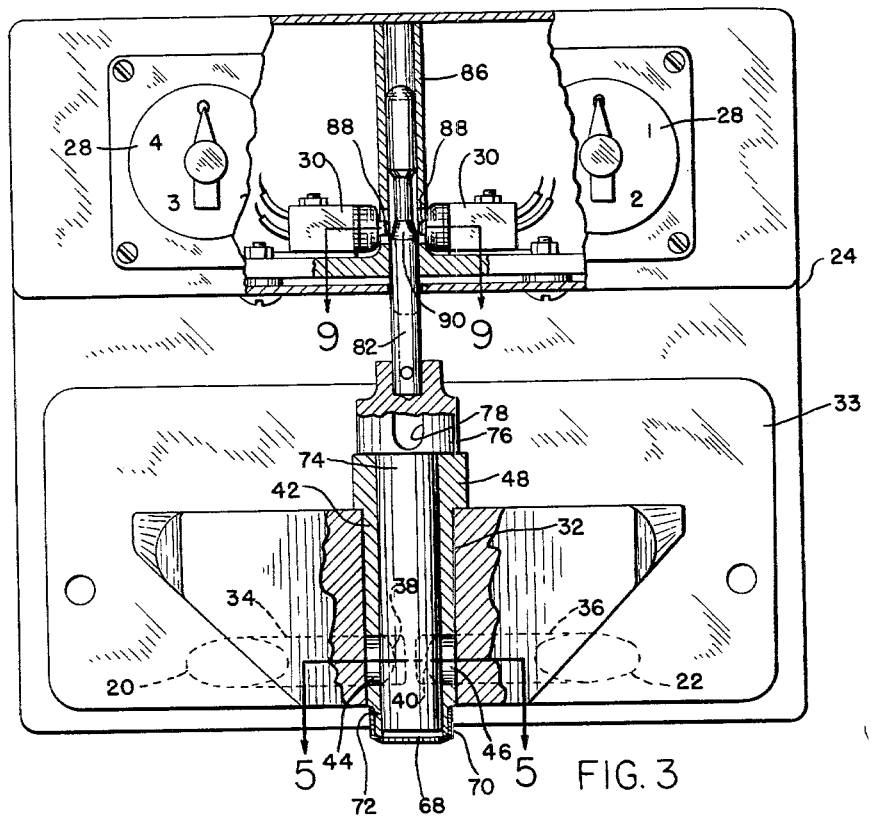
FIG. 3
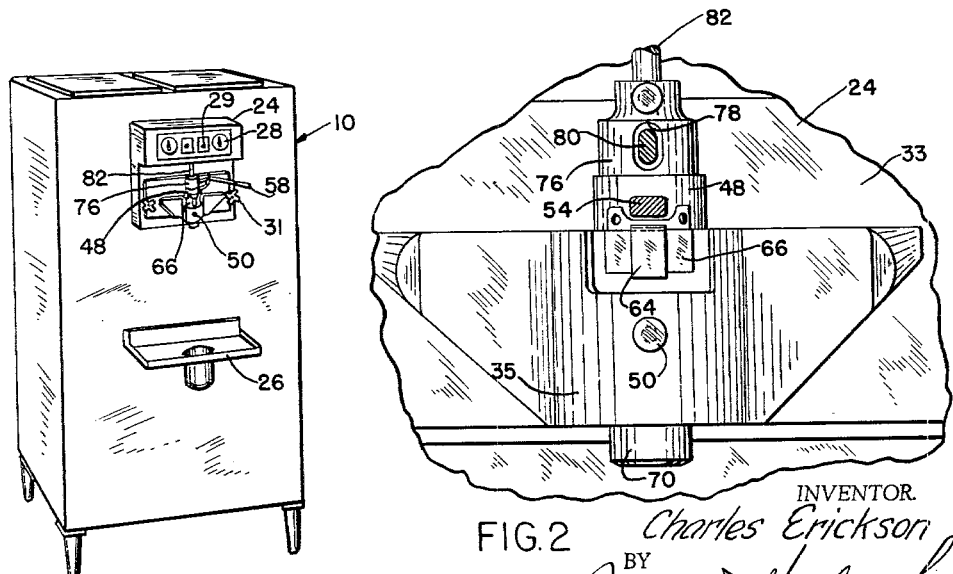
FIG. 1
FIG. 2
INVENTOR.
Charles Erickson
BY
Watson D. Harbaugh
ATT'Y.

Jan. 18, 1966   C. ERICKSON   3,229,477
ICE CREAM FREEZER AND DISPENSER
Filed March 4, 1963   4 Sheets-Sheet 2

INVENTOR.
Charles Erickson
BY
ATT'Y.

Jan. 18, 1966    C. ERICKSON    3,229,477
ICE CREAM FREEZER AND DISPENSER
Filed March 4, 1963    4 Sheets-Sheet 3

INVENTOR.
Charles Erickson
BY
Watson D. Harbaugh
ATT'Y.

Jan. 18, 1966  C. ERICKSON  3,229,477
ICE CREAM FREEZER AND DISPENSER
Filed March 4, 1963  4 Sheets-Sheet 4

INVENTOR.
Charles Erickson
BY
ATT'Y.

United States Patent Office 3,229,477
Patented Jan. 18, 1966

3,229,477
ICE CREAM FREEZER AND DISPENSER
Charles Erickson, South Nyack, N.Y., assignor, by mesne assignments, to The Bastian-Blessing Company, Chicago, Ill., a corporation of Illinois
Filed Mar. 4, 1963, Ser. No. 262,475
8 Claims. (Cl. 62—342)

The invention relates to an apparatus for soft-freezing confections, custards and ice cream mixes on a continuous standby operation for intermittently dispensing of two flavors through a single discharge port either simultaneously or separately or in any relative proportions.

One of the objects of the present invention is to dispense separately prepared multi-flavored soft frozen products in contiguous, tasty and eye appealing relationship while maintaining the flavors distinctively separate without intermixing them.

Another object of the invention is to provide a one-handed unitized control mechanism which variably regulates not only the proportions but the dispensing rate of two separately prepared soft-freeze mixes as a single product.

The invention is also characterized by visual assistance devices actuated by the control mechanism to indicate preselection and proportions of products dispensed.

The invention also contemplates a construction and arrangement of parts which are readily disassembled to be easily washed and cleaned so as to provide excellent sanitation within the most rigorous requirements.

Another object of the invention is to cut off cleanly the flow of products at the end of each dispensing operation without any waste, seepage or dripping from the dispensing nozzle.

The invention also contemplates interlocked controls by which the temperature and consistency of the product are maintained constant irrespective of the frequency or regularity of the intermittent dispensing of the products.

The invention is further characterized by the attractive ice cream cones that can be made with clean-cut, sharp color lines and contours under obviously sanitary conditions observed by the purchaser.

Figure 3A:
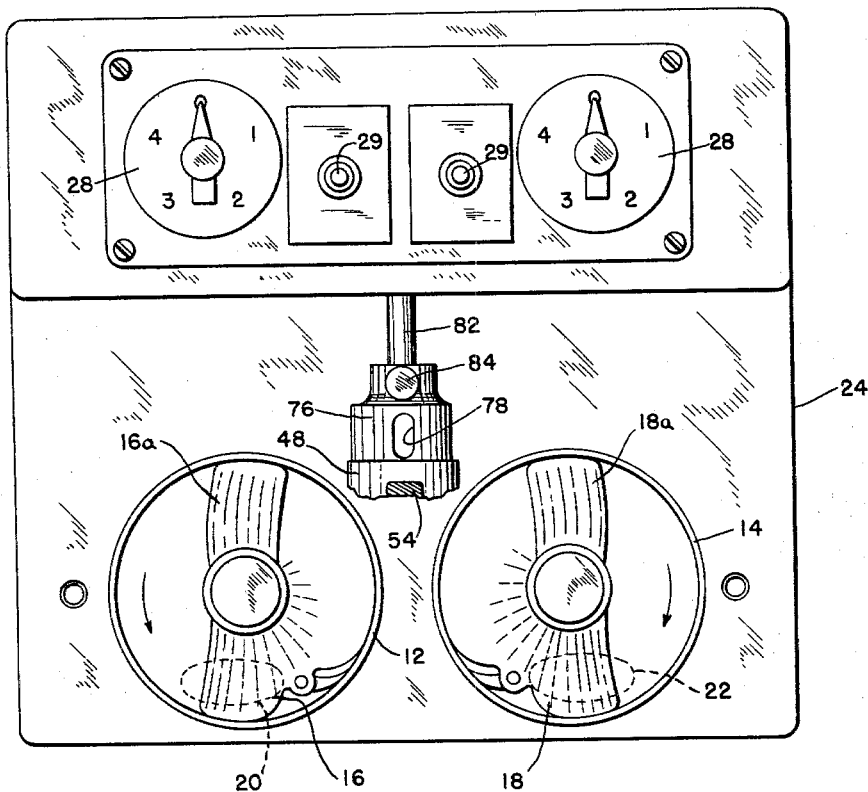
Figure 5:
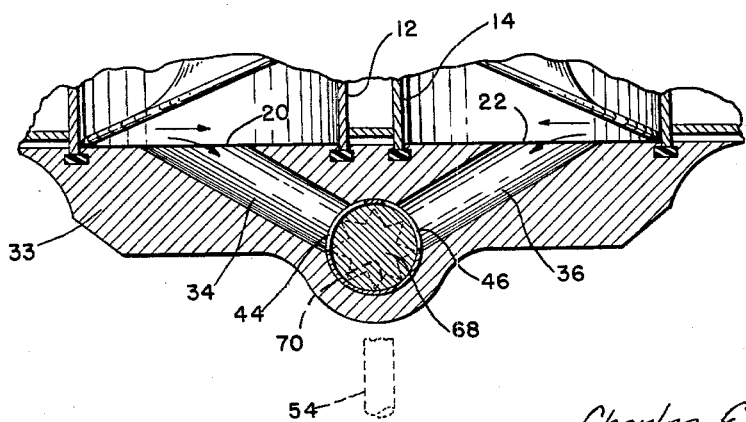
Figure 4A:
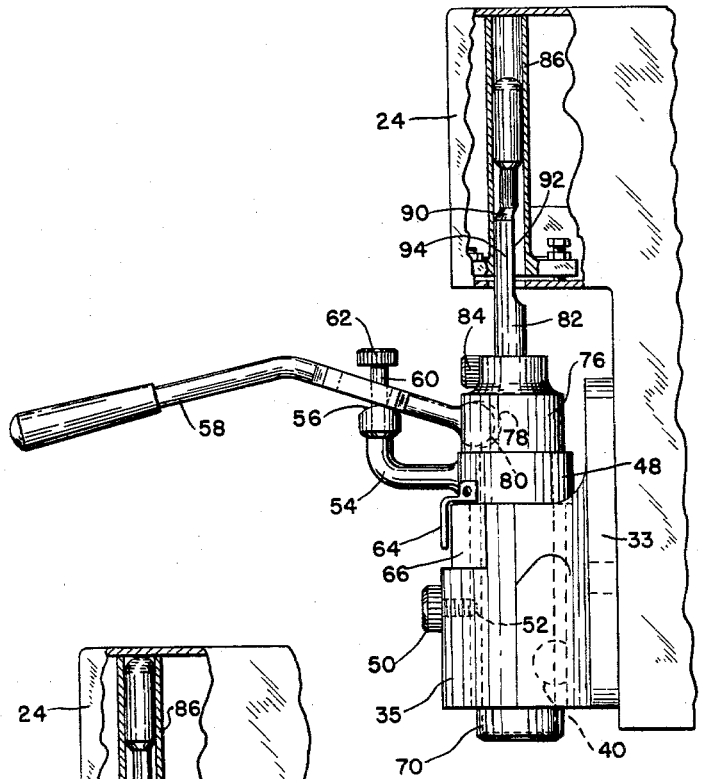
Figure 4:
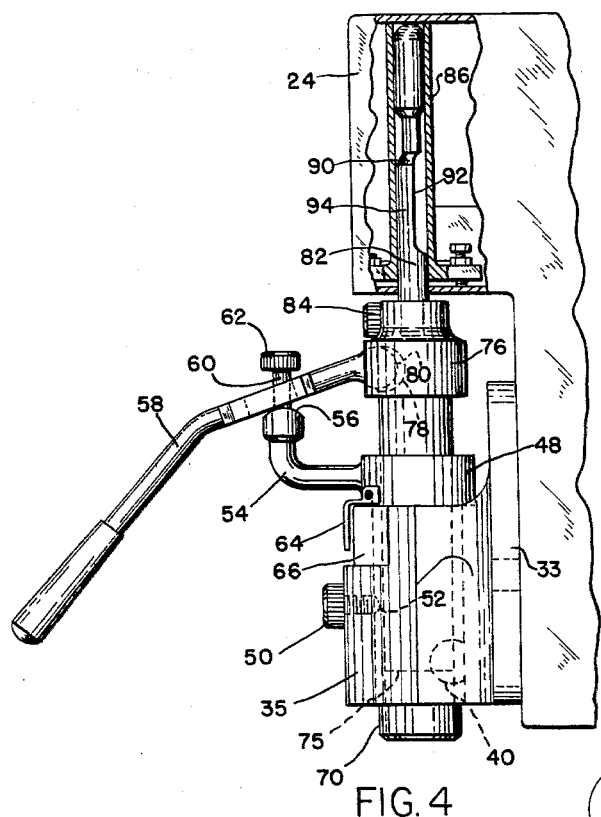
Figure 6:
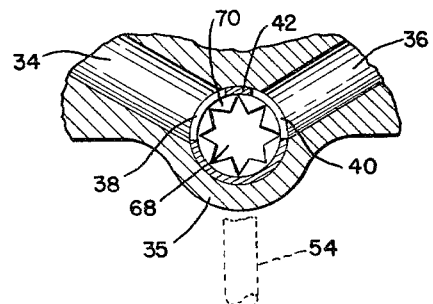
Figure 9:
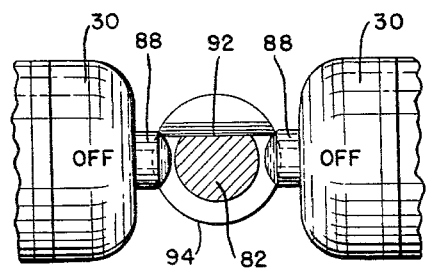
Figure 7:
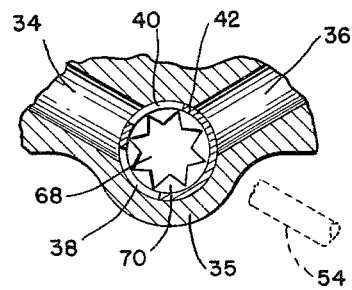
Figure 10:
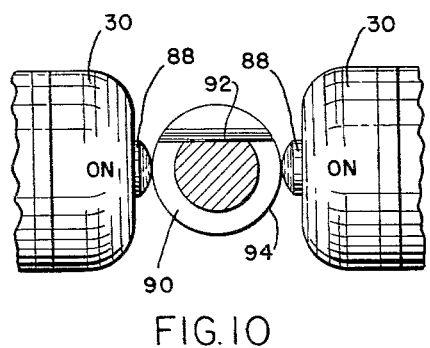
Figure 8:
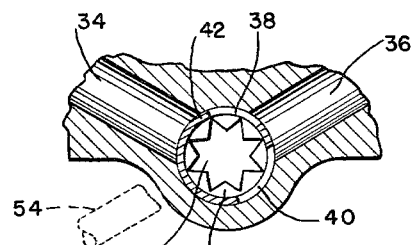
Figure 11:
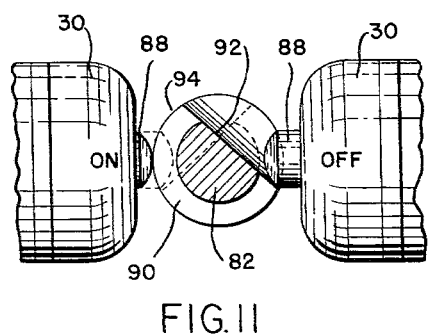

These being among the objects of the invention, other and further objects and advantages will appear from the description and the drawings relating thereto in which:

FIG. 1 is a perspective view taken from in front of a soft ice cream dispensing machine embodying the invention, FIG. 2 is an enlarged front elevational view of the dispensing portion of the machine, FIGS. 3 and 3a are deeper sectional views of the mechanism shown in FIG. 2 along with the manual control, the dasher controls for the machine and the operation of the dashers, FIGS. 4 and 4a are side elevational views partly in section of the mechanism shown in FIG. 3 with volume control parts shown in different positions, FIG. 5 is a section taken on line 5—5 of FIG. 3, FIGS. 6, 7 and 8 are views like FIG. 5 showing the products selection control in various selective positions, and FIGS. 9, 10 and 11 are sections taken on line 9—9 of FIG. 3 showing selective operative positions of the electrical controls for the dashers.

Referring now to the drawings, an ice cream soft-freezing machine 10 is shown having two freezing cylinders 12 and 14 (FIG. 3a) with dashers 16 and 18 therein rotated in opposite directions to whip and move the soft mix towards the front of the machine. The dashers rotate towards each other at the bottom and each has two impeller blades 16a and 18a adjacent their front ends for urging the mix into the outlet ports 20 and 22 respectively without pulsation. Their relative positions are shown in broken lines in FIGS. 3 and 3a. The machine is provided with necessary motors, refrigerating units, etc. (not shown) to operate the machine including automatic temperature switches and timed running switches for automatic operation.

A panel box 24 is mounted on the front wall of the machine and below it is provided a catch basin 26 for use when dismantling and cleaning the parts. The panel box 24 encloses the front ends of the freezer cylinders and has two switches for each freezer. The outer ones 28 are manually set for a cool down running period when starting the freezers at the beginning of the day, and the inner switches are selector "on-off" switches 29 to place the freezers in automatic or manual running operation when the freezer is "on."

Behind the top face of the panel there are located two "on and off" microswitches for control of the dasher motors. They in turn are actuated selectively or simultaneously when soft ice cream is to be dispensed by a rod 82 which is further described later.

Mounted by wing nuts 31 in a cylinder-sealing relationship is a closure 33 having a central vertical boss 35 with a vertical bore 32 therethrough (FIG. 3) and two horizontal discharge conduits 34 and 36. Conduit 34 interconnects the cylinder outlet port 20 with a valve port 38 at the bore 32 and the conduit 36 interconnects the outlet port 22 with a valve port 40 at the bore 32. Towards the rear of the bore 32 the valve ports 38 and 40 are spaced only a slight distance apart whereas in front they are spaced almost 180° apart as seen in FIG. 5.

A valve sleeve 42 is rotatably mounted in the bore 32 and has two openings 44 and 46 disposed in alignment with valve ports 38 and 40, respectively, when the valve sleeve is in its rotatably center position. This permits ice cream to flow from both cylinders simultaneously. The valve sleeve 42 is held in its working position against vertical displacement by a flange 48 at the top resting on the top of the boss 35 and is releasably secured there against upward movement by a thumb screw 50 threaded through the wall of the boss to engage loosely in a horizontal groove 52 on the valve sleeve 42. The length of the groove 52 also provides the limits for the rotary movement of the valve sleeve 42.

Selective rotary positioning of the valve sleeve during dispensing is accomplished through a crank arm 54 secured to the flange 48. The outer end of the crank arm 54 is upright and has a shoulder 56 to serve as a fulcrum pivotally supporting a handle lever 58 thereon as loosely held in place on a pin 60 by a retainer nut 62.

The relative position of the sleeve valve 42 for valving the output of the freezers is indicated visually by a shadow finger 64 attached thereto which depends in front of and passes back and forth over two contiguous color areas on a panel 66 that is recessed on the top front face of the boss 35. In intermediate positions of the sleeve valve 42 portions of both color areas are exposed on opposite sides of finger 64 in a relationship corresponding to the relative flow of ice cream through the valve ports. At either extremes of valve sleeve movement only one color area is exposed.

At its lower end the valve sleeve 42 is reduced in diameter to receive a serrated nozzle 70 and the edge can be turned inward to provide a flange stop 72 (FIG. 3). The nozzle 70 preferably is secured releasably in place by a bayonet joint arrangement and can provide any one of several openings 68 which would produce a cross-sectional design for the soft mix discharged from the sleeve valve.

A piston valve 74 is slidably mounted in the sleeve valve 42 so that its lower end closes the valve openings 44 and 46 in its fully closed position and terminates quite close if not resting upon the flange stop 72 to clear the valve sleeve 42 of ice cream when closed. Downward movement of the piston valve 74 is otherwise limited by a head portion 76 engaging the flange 48.

It will be observed in connection with FIG. 4 that the opening limit for the piston valve as indicated at 75 does not need to fully clear the opening 40. The flow area allowed is more than adequate. The flow area of the ports, conduits and openings is extra large for easy cleaning and the piston valve as herein arranged provides a proper flow limiting factor which assures proper mixing and prevents clogging by extra cold cream. Otherwise circuitous passages would be confronted with such adverse occurrences.

The head portion 76 has a recess 78 therein which receives the ball-like working end 80 (FIG. 4) of the lever handle 58 so that raising and lowering the handle lowers and raises the piston valve 74 as operative about the fulcrum 56 while on the other hand lateral swinging movement of the handle moves the arm 54 to select or proportion the ice cream flowing from the freezer cylinders as indicated by the shadow finger 64 on the color panel 66.

The upper end of the head 76 is recessed to support a switch control rod 82 therein as releasably held in place by set screw 84. The upper end of the control rod 82 passes between the microswitches 30 and is supported thereabove in guided relationship by a guide sleeve 86.

Over the length of the control rod 82 where it passes buttons 88 of the switches in its movement by handle 58, the rod is contoured to cooperate with the switches. In this area the rod is relieved to relinquish engagement with the buttons 88 at a taper 90 when ice cream is not to be dispensed (FIG. 9), as when both valve openings 44 and 46 are closed by the piston valve 74. On the back side of the rod, however, the rod is longitudinally relieved below the taper 90 as by cutting a flat 92 therein. The flat is so arranged that when the piston valve is raised the flat is disposed opposite either one of the switch buttons 88 as when the handle 58 is at either limit of its horizontal movement (FIG. 10) the unrelieved portion 94 engages and actuates the other button 88 (FIG. 11) to start that particular motor of the freezer cylinder from which ice cream is to be dispensed. If the handle is rotated to or through any intermediate position at any time while the machine is dispensing, the angularity of the flat 92 cams the buttons and both switches are closed (FIG. 11). This supplies ice cream from both freezer cylinders in a proportion that is controlled by the position of the sleeve valve 42.

In operation the timers 28 are set for a predetermined "cool-down" running time when the machine is again started after being shut down for a while. The switches 29 are then turned to "automatic" and the machine left to run until it stops automatically. Thereafter an ice cream cone is held under the nozzle 70 and the handle 58 is moved horizontally to a selected proportioning position as portrayed on the color panel. The handle 58 is then depressed to raise the piston valve to start flow at 68 and the control rod 82 closes the switches that are necessary to start the appropriate dasher motors and the dasher blades 16, 18 or both, to move the soft frozen mix out through the ports 20 or 22 in the proportions expected. The dual blades 16, 16a and 18, 18a in the respective cylinders eliminate pulsation of the mixture as it leaves the nozzle.

Thereafter the handle 58 can be moved in any direction desired by the operator to vary the proportions of the ice creams or the rate of delivery in order to provide a desired product design. Then when the handle is ultimately released it closes off flow and provides a clean break at the nozzle. After closure, the freezer continues to run a few seconds to bring replenishing cream down to desired coolness and consistency ready for a repetition of the operation.

Having thus described the embodiment illustrated it will be seen how the various objects of the invention are attained and how further changes and adjustments can be made within the spirit of the invention the scope of which is commensurate with the appended claims.

What is claimed is:

1. In a soft ice cream freezer the combination of two freezing cylinders with their discharge ends side by side, dashers rotating in opposite directions with respect to each other and having spaced end blades urging the cylinder contents towards said ends, closure means for said ends having outlet ports for said cylinders disposed off-center thereof and adjacent to the side walls of the cylinders where the dasher blades are rotated towards each other, dispensing port on said closure means, conduit means converging towards each other to the dispensing port from said outlet ports, first valve means for selectively controlling and varying the flow through said conduits, second valve means including a piston for controlling the amount of flow through said dispensing port, said piston extending to the bottom end of the dispensing port in its closing movement to stop flow through the dispensing port and clear the dispensing port of all flow that has been admitted through the first valve means, and manual means for operating the two valve means concurrently.

2. In a soft ice cream freezer the combination of two freezing cylinders with their discharge ends side by side in a common plane, dashers rotating in opposite directions with respect to each other and having a plurality of angularly spaced end blades urging the contents of the cylinders towards said ends, closure means for said ends having outlet ports for said cylinders off-center thereof as disposed adjacent to the side walls of the cylinders where the dasher blades are rotating towards each other, dispensing means in said closure means including a single dispensing passage terminating in a nozzle opening, conduit means extending from said outlet ports at acute angles thereto converging towards each other to the dispensing passage, first valve means for selectively controlling and varying the proportions of the flow through said conduits terminating at said nozzle opening, second valve means for controlling the amount of flow through said dispensing port and in its closed position extending to said nozzle opening, and manual means for operating the two valve means concurrently.

3. In a soft ice cream freezer the combination of two freezing cylinders with their discharge ends side by side, dashers rotating in opposite directions with respect to each other and having spaced end blades urging the cylinder contents towards said ends, means for rotating said dashers independently of each other, closure means for said ends having outlet ports for said cylinders off-center thereof as disposed adjacent to the side walls of the cylinders where the dasher blades are rotating towards each other, a dispensing port in said closure means, conduit means converging towards each other to the dispensing port from said outlet ports, first valve means for selectively controlling the flow through said conduits to give a proportional mixture of flow from the two freezing cylinders to the dispensing port, second valve means for controlling the proportioned mixture of flow through said dispensing port, and manual means interconnecting said first and second means for operating the two valve means concurrently, said manual means including means for actuating one of said dasher rotating means concurrently with said first valve means and means for actuating both of said dasher rotating means concurrently with actuation of said second valve means.

4. In a soft ice cream freezer the combination of two freezing cylinders with their discharge ends in close proximity to each other, dashers rotating in opposite directions with respect to each other, spaced end blades on said dashers urging the cylinder contents towards said ends, closure means for said ends having outlet ports for said cylinders disposed off-center thereof and adjacent to the side walls of the cylinders where the dasher blades are rotating towards each other, a dispensing conduit in said closure means, conduit means converging towards each other to the dispensing conduit from said outlet ports and opening into said conduit at spaced ports, sleeve valve means rotatable in said dispensing conduit, having spaced openings for selectively controlling the flow through said spaced ports and terminating in a serrated nozzle, valve means slidable in said sleeve valve means for controlling the amount of flow through said spaced openings and terminating in its closed position in close proximity of said serrated nozzle, and manual means for operating the two valve means concurrently.

5. In a soft ice cream freezer the combination of two freezing cylinders with their discharge ends side by side, dashers rotating in opposite directions with respect to each other and towards each other at their bottoms and having spaced end blades urging the cylinder contents towards said ends, closure means for said ends having outlet ports for said cylinders disposed where the dasher blades are rotating towards each other, dispensing port on said closure means, conduit means converging towards each other to the dispensing port from said outlet ports, sleeve valve means for selectively controlling and varying the flow through said conduits including a removable serrated nozzle carried on the dispensing end thereof, reciprocating valve means for controlling the amount of flow through said dispensing port including a piston terminating close to said nozzle in valve closing position, and manual means for operating the two valve means concurrently.

6. In a soft ice cream freezer the combination of two freezing cylinders with their discharge ends side by side in a common plane, dashers rotating in opposite directions with respect to each other and having a plurality of angularly spaced end blades urging the contents of the cylinders towards said ends, removable closure means for said ends having outlet ports of large washable size for said cylinders disposed near the sides of the cylinders where the dasher blades are rotating towards each other, dispensing means in said closure means including a single dispensing passage of large washable size terminating in an opening, conduit means of large washable size extending from said outlet ports at acute angles thereto and converging towards each other and terminating in openings at the dispensing passage, first valve means for selectively controlling and varying the flow through said conduits terminating at said openings including a removable valve sleeve movable across said openings with a large washable straight conduit therethrough, second valve means for controlling the amount of flow through said dispensing passage including a piston valve element only partially exposing said openings in its open position and terminating in close proximity to the nozzle opening in its closed position, and manual means for operating the two valve means concurrently.

7. In a soft ice cream freezer the combination of two freezing cylinders with their discharge ends in close proximity to each other, dashers rotating in opposite directions with respect to each other and having spaced end blades urging the cylinder contents towards said ends, means for rotating said washers independently of each other, closure means for said ends having outlet ports for said cyinders off-center thereof as disposed near the sides of the cylinders where the dasher blades are rotating towards each other, a dispensing conduit in said closure means terminating in a serrated nozzle, conduit means converging towards each other to the dispensing conduit from said outlet ports and opening into said conduit at spaced ports, sleeve valve means removably rotatable in said dispensing conduit and having spaced openings for selectively controlling the flow through said spaced ports, piston valve means removably slidable in said sleeve means for controlling the amount of flow through said spaced openings and terminating in its closed position in close proximity in said serrated nozzle and manual means interconnecting said piston and sleeve means for operating the two valve means concurrently, said manual means including means removably carried by said piston valve means for actuating one of said dasher rotating means concurrently with said piston valve means and an element actuating both of said dasher rotating means concurrently with proportional flow actuation of said sleeve valve means.

8. The combination called for in claim 7 in which said ramovably carried means includes a taper for activating both dasher rotating means when the piston valve means is opening for proportional dispensing and said element deactivates one of said dasher rotating means selectively with movement of the sleeve valve means from its proportioning position.

References Cited by the Examiner

UNITED STATES PATENTS

| | | | |
|---|---|---|---|
| 2,556,780 | 6/1951 | Shryock | 137—625.17 |
| 2,680,455 | 6/1954 | Raiteri | 137—555 |
| 2,767,553 | 10/1956 | Lewis | 62—342 X |
| 3,052,381 | 8/1962 | Carpigiani | 222—132 |

ROBERT A. O'LEARY, *Primary Examiner.*